Figure 1:
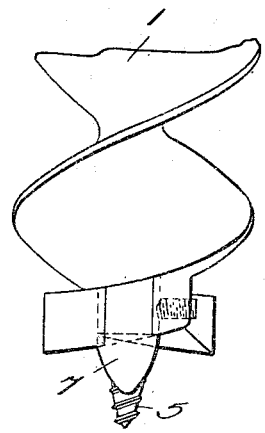

W. A. NADOLNEY.
AUGER.
APPLICATION FILED MAR. 18, 1918.

1,281,813.

Patented Oct. 15, 1918.

W. A. Nadolney
Inventor

By Geo. P. Kimmel
Attorney

UNITED STATES PATENT OFFICE.

WILLIAM A. NADOLNEY, OF NANTICOKE, PENNSYLVANIA.

AUGER.

1,281,813.

Specification of Letters Patent. Patented Oct. 15, 1918.

Application filed March 18, 1918. Serial No. 223,126.

*To all whom it may concern:*

Be it known that I, WILLIAM A. NADOLNEY, a citizen of the United States, residing at Nanticoke, in the county of Luzerne and State of Pennsylvania, have invented certain new and useful Improvements in Augers, of which the following is a specification.

This invention relates to improvements in augers and has for its object the provision of an auger having detachable cutting blades and screw, whereby, in the event that the same becomes broken or worn, they can be easily and quickly replaced, thus, effecting a material saving upon part of a user.

The improvements in the details and arrangement of parts will be apparent from an inspection of the accompanying drawings, in connection with the specific description hereinafter contained, and wherein the preferred embodiment of the invention is disclosed for the purpose of imparting a full understanding of the same.

Figure 3:
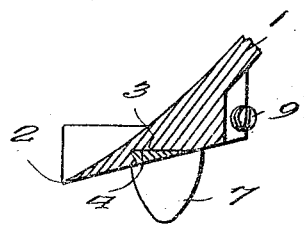
Figure 2:
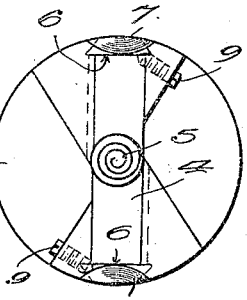
Figure 4:
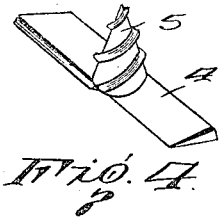
Figure 5:
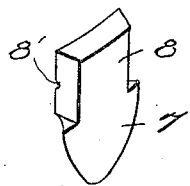

In the drawings:

Figure 1 is a side elevation of a fragment of an auger having the improved detachable cutting blades and screw engaged therewith, Fig. 2 is a bottom plan of the same, Fig. 3 is a fragmentary vertical section therethrough, Fig. 4 is a detail in perspective of the screw, and Fig. 5 is a detail in perspective of one of the cutting blades.

Having more particular reference to the drawings, in connection with which like reference characters will designate corresponding parts throughout the several views, 1 represents the auger, the lower portion of which is of course, provided with the usual cutting edges 2, while in the bottom of said auger a transversely disposed dove-tailed groove 3 is formed and is adapted to receive a piece 4 therein, said piece having the upper and lower faces thereof tapered and carrying, intermediate its end, the usual form of screw 5, whereby the cutting edges of the auger are initially engaged with the work being bored therewith.

Other dove-tailed grooves 6 are formed at diametrically opposite points in the thickened sides of the lower portion of the auger 1, preferably, at points adjacent the extremities of the transverse groove 3 and receive therein cutting blades indicated in their entireties by the numeral 7, said cutting blades being formed with dove-tailed shanks 8 having notches 8' formed in certain of the marginal portions thereof. Screw threaded opening extend horizontally through the thickened lower portions of the auger 1 and are adapted to receive set screws 9 therein, the inner ends of which are engaged with the notches 8' formed in certain of the marginal portions of the dove-tailed shanks 8, thus, locking said cutting blades in position and positively preventing undue movement of the same with relation to the auger. Further, it will be appreciated that by arranging the cutting blades 7 adjacent the opposite ends of the piece 4, lateral shifting or movement of the same will be prevented and as a consequence, the screw 5 will at all times be maintained in proper position with relation to the auger and in this way, insure proper functioning of the same.

I desire to have it understood, that different forms of cutting blades may be substituted for those shown herein, such as conditions or preference may dictate; further, that the specific form of screw 5 may be varied, should it become necessary.

As above indicated, I do not wish to be understood as confining the invention to the particular embodiment chosen for illustration herein, nor to the exact construction, arrangement and adaption of the parts shown and described, but I reserve the right to make any changes and alterations that clearly fall within the spirit and scope of the invention as claimed.

I claim:

1. In combination with an auger having a diametrically disposed groove formed in the bottom thereof and vertical grooves formed in the sides thereof adjacent the ends of said diametrically disposed groove, a piece removably engaged with said diametrically disposed groove carrying a screw intermediate its ends, and cutting blades removably arranged in the vertical grooves.

2. In combination with an auger having a diametrically disposed dove-tailed groove formed in the lower end thereof, vertically disposed dove-tailed grooves formed in the sides thereof adjacent the ends of said diametrically disposed groove, a dove-tailed piece having tapered upper and lower faces removably arranged in said diametrically disposed groove, cutting blades formed with dove-tailed shanks removably arranged in said vertical grooves, and means passing through the adjacent portions of the auger into engagement with the dove-tailed shanks of said cutting blades.

In testimony whereof I affix my signature hereto.

WILLIAM A. NADOLNEY.

Copies of this patent may be obtained for five cents each, by addressing the "Commissioner of Patents, Washington, D. C."